United States Patent Office 3,581,408
Patented June 1, 1971

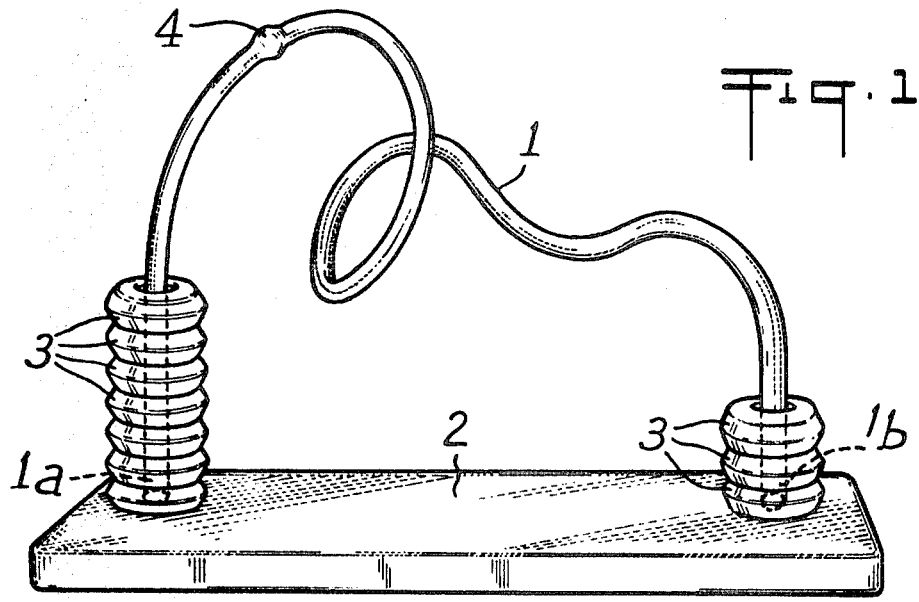
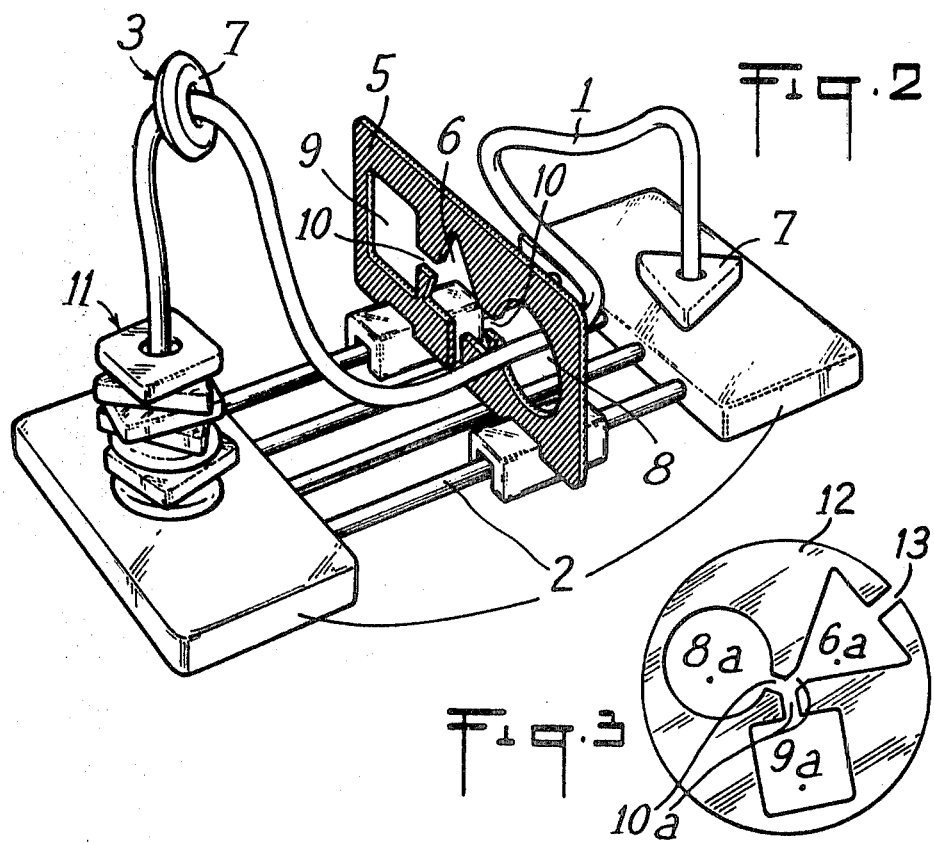
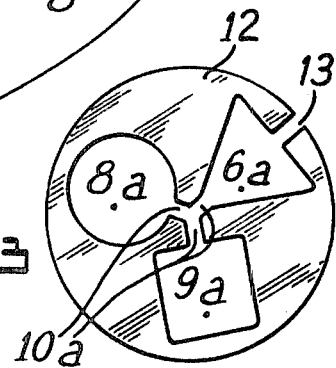

3,581,408
MANUAL DEXTERITY MEASURING AND
TRAINING DEVICE
Jacques Emile Mohier, Rue de la Garenne,
Croth par Sorel-Moussel 28, France
Filed Feb. 4, 1969, Ser. No. 796,487
Claims priority, application France, Feb. 5, 1968,
138,634
Int. Cl. G09b 19/00
U.S. Cl. 35—22          7 Claims

ABSTRACT OF THE DISCLOSURE

A manual dexterity measuring and training device having a semi-rigid rod forming a path which may be changed. On the rod are slidably mounted annular objects which may be moved by hand or otherwise. Also included in the invention is a plate which may move relative to the rod and annular objects.

---

There is known apparatus made of rods of generally non-linear form serving as a path for objects on the rod.

Specifically, one type of psychotechnic device is known as the Dexterimeter of Pieron. The object of this device consists in moving a ring without contact along the length of a metallic rod forming a path. The metallic ring is fixed at the end of a sleeve held in the hand of the subject and connected to an electric pulse counter. Each time that there is a contact between the ring and the rod, the counter registers a count. The rod-path is fixed on a base at its two extremities and turns in several directions in space to give it a fixed and determined form. The test is to pass the ring from one end to the other of the path as quickly as possible and with as few contacts as possible between the ring and the rod.

There is also known the Dexterimeter of Moede whose path is also made by a rigid wire of fixed and determined form. The wire is twisted in space and fixed at its ends on a base as in the preceding device. However, for this device, there are no rings, but several washers, in general, 55, on the wire. The test is to pass all the washers from one end to the other of the path and then passing the washers back to their starting point, in the least time possible with one hand or the other.

All the known types of Dexterimeters, and specifically the two types noted above, have fixed paths, with a fixed form and a fixed cross section. They have the disadvantage of not having the capability to alter the difficulty or extent of the test, which is very desirable.

The present invention has for an object a device which differs from the known devices in that the path on the same device may take very different forms and cross-sections, enabling the difficulty of the test to be varied and enabling progressive learning or an appreciation of the movements necessary for the passage of rings, washers, rondels, or any other object of appropriate form from one end to the other of the path.

Many other advantages, features, and additional objects of the present invention will become manifest to those versed in the art upon making reference to the detailed description and the accompanying sheet of drawings in which preferred structural embodiments incorporating the principles of the present invention are shown by way of illustrative example.

On the drawings:

FIG. 1 is a perspective view of a device according to the invention.

FIG. 2 is a perspective view of an alternative embodiment of the invention having a plate interposed along the path of the rod.

FIG. 3 is a plan view of a movable plate which may be mounted on the rod.

As shown in the drawings:

The principles of this invention are particularly useful when embodied in a Dexterimeter as shown in FIG. 1.

The path is made of a semi-rigid rod 1 which is capable due to its flexibility to be shaped by the hand to assume different paths and different cross-sections while maintaining a sufficient rigidity in order that its shape or form will not be changed during the course of a test. The two extremities 1a, 1b, of the rod 1 are mounted on a base 2. On the rod 1 are a selected number of rings 3, washers, rondels or other objects having annular orifices. The test or task consists of passing the rings 3 or washers from one end to the other of the rod 1, and, if it is desired, in as short a time as possible. It is possible to use a device to sense and record contacts as in the pieron system.

The semi-rigid nature of the rod 1 enables it to easily assume a non-uniform cross-section, for example, with bulges 4 at places which constitute the points which are hard to pass annular objects, which brings a supplementary factory in the evaluation for training of dexterity. In place of bulges, it is possible to make points where the cross-section is non-circular, for example, the orifice of the annular objects 3 being correspondingly non-circular, which further adds to the range of possibilities for the device. This device is useful, in psychotechnical tests of manual dexterity and of perception of contours in space. It also enables progressive training of very young infants or psychomotor defectives to manipulate the objects in several directions in space. Finally, it may be a toy of wide diffusion, appealing to little children by the very difficulty of the task to be accomplished.

A large number of materials, of complex compounds are available on the market which may be used to make a rod 1 according to the invention. For example, the shaft may be a steel spiral spring surrounded by a plastic material, such as a flexible glass fiber covered by a semi-plastic elastomer.

It is possible to vary the thickness, the initial cross-section, the length of the rod-path, the number, the form, the nature and the size of the rings, washers, or other sliding objects on the rod-path, the nature of the material utilized and the nature of the task to be accomplished without departing from the scope of the present invention. It is also possible to vary the system for measuring dexterity and organizing the device such that the rod is movable while the annular objects are fixed.

According to another embodiment of the invention, FIG. 2, the task to be accomplished is completed by the passage of the annular objects 3 through orifices in the rod-path. A plate 5 is mounted on the base 2 approximately perpendicular to the path and is provided with a triangular orifice 6, for example.

The rod 1 is provided with annular objects 7 which have an exterior shape similar to that of the orifice 6 and the operator in the carrying out of the task must slide the objects along the length of the rod 1 and assure in addition their passage through the triangular orifice 6. The range of possibilities is expanded when the plate 5 is provided with three orifices, one round 8, another square 9, and the third triangular 6. Each of these orifices is connected to the adjacent orifices by a slot 10 through which may pass the rod 1. The annular objects are then provided by groups, with the three forms of orifices above.

The user having to pass a round object 3, for example, must then position the rod 1 through the round orifice 8, if the following object is a square 11, he must move the rod 1 into the square orifice 9, and so forth. An optical or acoustical signaling system upon passage of an object through an orifice may be provided.

The nature and the mounting of the plate 5 may be varied, without departing from the spirit of the present invention.

According to another embodiment of the invention, a movable plate 12 is provided having orifices 6a, 8a, 9a, connected by slots 10a. The plate 12 may be engaged on the rod 1 by a slot 13 which connects one of the orifices with the edge of the plate, FIG. 3.

In this embodiment, the plate 12 is held manually by the user and it is moved through the slots 10a, in order to engage the rod 1 in one of the orifices 6a, 8a, 9a.

I claim:

1. A manual dexterity measuring and training device including a base having semi-rigid rod means thereon, said rod means being capable of manual shaping so as to assume different paths and different cross-sections, annular object means slidable relative to the rod means on the base, and a plate interposed along the path of the rod means, the plate having an orifice through which passes the rod means.

2. A manual dexterity device according to claim 1 wherein the plate has several orifices of different forms.

3. A manual dexterity device according to claim 2 wherein the exterior shape of the annular object means correspond to one of the orifices of the plate.

4. A manual dexterity device according to claim 3 wherein the exterior forms of the annular object means correspond to each of the orifices of the plate.

5. A manual dexterity device according to claim 3 wherein the orifices of the plate are connected to each other by a slot in which the rod means may move.

6. A manual dexterity device according to claim 1 wherein the plate is fixed.

7. A manual dexterity device according to claim 1 wherein the plate is movable on the rod.

References Cited

UNITED STATES PATENTS 2,623,303   12/1952   Mindel _____ 35—22(.5)

FOREIGN PATENTS 966,229   3/1950   France _____ 273—1(E)

WILLIAM H. GRIEB, Primary Examiner

U.S. Cl. X.R.

273—1R